United States Patent [19]

Akuzawa

[11] Patent Number: 4,896,189
[45] Date of Patent: Jan. 23, 1990

[54] LID OPENING AND CLOSING DEVICE FOR IMAGE INPUT APPARATUS

[75] Inventor: Yoshihide Akuzawa, Shizuoka, Japan
[73] Assignee: Tokyo Electric Co., Ltd., Tokyo, Japan
[21] Appl. No.: 284,660
[22] Filed: Dec. 15, 1988
[30] Foreign Application Priority Data Dec. 15, 1987 [JP] Japan .............................. 62-190449[U]

[51] Int. Cl.[4] .............................................. G03B 27/62
[52] U.S. Cl. ........................................................ 355/75
[58] Field of Search ........................................... 355/75

[56] References Cited

U.S. PATENT DOCUMENTS 4,124,296 11/1978 Kishi et al. ............................. 355/75
4,390,267 6/1983 Minor ..................................... 355/75

FOREIGN PATENT DOCUMENTS 59-23670 6/1984 Japan .

Primary Examiner—Donald A. Griffin
Attorney, Agent, or Firm—Oblon, Spivak, McClelland, Maier & Neustadt

[57] ABSTRACT

A lid opening and closing device is disclosed which comprises a plate spring having thereon an engagement portion disposed on the side of a lid and an engagement portion to engage with the engagement portion on the plate spring formed on the side of a housing, whereby the lid can be held opened at a certain angle of opening, a lid pivot for bearing a fulcrum pin on the lid side provided on the housing side for vertical movement while being urged downward, whereby reading of an original is ensured even if the thickness of the original is varied, and flat portions formed on the fulcrum pin and a cut corresponding to the flat portions made in the lid pivot, whereby the fulcrum pin can be detached from the lid pivot, thus performing necessary functions with a simple structure occupying a samll space on the whole.

4 Claims, 4 Drawing Sheets

LID OPENING AND CLOSING DEVICE FOR IMAGE INPUT APPARATUS

FIELD OF THE INVENTION AND RELATED ART STATEMENT

The present invention relates to a lid opening and closing device for an image input apparatus of a structure in which a lid positioned over the top face of a housing incorporating an optical reading unit therein is detachably attached to the housing for opening and closing.

For use in a copying machine, there has so far been known a device of which a lid covering a housing including an optical reading unit is rotatably coupled with the housing by hinges, and further, a toggle mechanism including a compression coil spring is mounted on the top face of the housing, and therein, the lid is urged in its closing direction by the force of the compression coil spring in the toggle mechanism and, when the lid is opened past a dead point, the direction of the force of the compression coil spring acting on the lid is inverted, so that the lid is stopped at any desired position by balance of force between the compression coil spring and the deadweight of the lid.

In such an arrangement, it is required to mount a toggle mechanism on the top face of the housing, and further, the hinge must be made larger in size to cause the toggle mechanism to operate in association with its turning, and hence, such a lid opening and closing device requires a large space for installation.

When using the device, since the lid can be stopped at a position while it is opened, a thin original can be easily set onto the original table. However, when setting an opened thick book, the lid slants with its free end floating in the air, and hence, it becomes difficult to keep the book in close contact with the original table. Thus, the image coming out of focus cannot be distinctly read by the optical reading unit. Further, there is such a problem that, when the image of a portion of an original larger than the size of the original table is to be read, the original cannot be easily spread out because the hinge or the toggle mechanism interferes with it.

Such being the case, there is a structure disclosed in Japanese Patent Publication No. 59-23670, though its image input unit is of different basic design. The structure is such that an instrument case incorporating an optical reading unit therein is supported on the original table by means of a hinge mechanism with pillars. More particularly, a hinge mechanism having pillars is attached to the instrument case, and the pillars are fitted to the original table for vertical sliding, whereby the position in the vertical direction of the instrument case with respect to the original table is made variable. In normal cases, the instrument case is adapted to be turned up and down by the hinge mechanism.

Hence, three states of the instrument case, that is, a state of the instrument case turned up and turned down with reference to the original table, a state of the instrument case adjusted in its height above the original table, and a state of the instrument case separated from the original table, are obtained.

With the structure as described in the Japanese Patent Publication No. 59-23670, there are such problems that the structure of the hinge mechanism for holding the instrument case at a certain angle of opening is complex and that the instrument case cannot be installed on the original table in a stabilized state, because it is held in place only be means of the pillars slidable up and down.

OBJECT AND SUMMARY OF THE INVENTION

A first object of the present invention is to reduce the space for installing the fixture of the lid on the housing.

A second object of the present invention is to provide a structure capable of handling the lid in a stabilized state even if the original is thick.

A third object of the present invention is to simplify the structure of the fixture of the lid.

A fourth object of the present invention is to provide a structure permitting the lid to be easily removed from the housing.

Present invention is characterized in that it comprises fulcrum pins arranged on a common axis and fixedly provided at least at both sides of the base of a flat lid covering the top face of a transparent original table on a housing incorporating an optical reading unit therein, a lid pivot, with a shaft hole made therein for allowing the fulcrum pin to fit therein for rotation, arranged to fit in the housing at one end thereof for vertical movement while being urged downward, flat portions provided at portions of the periphery of the fulcrum pin virtually in parallel with the plane of the lid, a cut made in the lid pivot communicating with the shaft hole, with an opening at its upper end, and having a width smaller than the diameter of the shaft hole for guiding the flat portions of the fulcrum pin therethrough, a plate spring, provided with an engagement portion, attached to the lid on its inner face close to the fulcrum pin, and an engagement portion provided on the top face of the lid pivot or the housing for engaging with the engagement portion on the plate spring when the lid is held opened at a desired angle with the original table.

Since the lid pivot supporting the fulcrum pin of the lid is fitted in the housing right below the fulcrum pin, the space required for installing the lid opening and closing device is reduced. Further, since the dead weight of the lid is supported by the engagement effected by spring action between the engagement portion on the plate spring and the engagement portion provided on the housing side, it becomes possible to set an original onto the original table with the lid stopped at a certain angle of opening, and since this effect is provided by the resilient force of the plate spring, the structure is simplified. While the lid pivot is allowed to ascend according to the thickness of the original put in between the original table and the lid, the lid pivot is urged downward, and hence, its operation is stabilized and any original can be constantly put in close contact with the original table regardless of its thickness. Further, when the lid is rotated until the flat portions of the fulcrum pin of the lid comes in coincidence with the side wall edges of the cut in the lid pivot, the lid can be removed by pulling up the fulcrum pin from the shaft hole. Since what is attached to the side of the lid at this time is only the plate spring, the lid can be handled easily. Further, since the lid can be separated from the housing, an image in an original having a larger area than the original table can be read by the housing incorporating the optical reading unit therein.

DETAILED DESCRIPTION OF PREFERRED EMBODIMENTS

Figure 7:
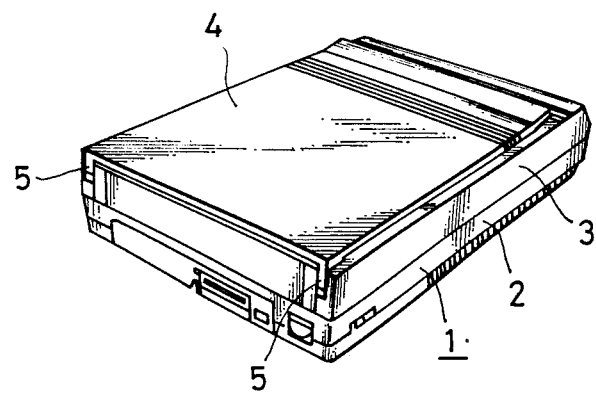
FIG. 7 is a perspective view showing in a reduced scale a housing of an image input apparatus.

An embodiment of the present invention will be described with reference to the accompanying drawings. FIG. 7 is for showing a housing 1 of an image input apparatus, in which the housing 1 is composed of a main housing 2 with an opening on its upper side and a top cover 3 with an opening on its lower side coupled together. Reference numeral 4 denotes a flat lid covering an original table on the housing 1 and there are provided tongue pieces 5 on both sides of the base portion of the lid 4.

Figure 6:
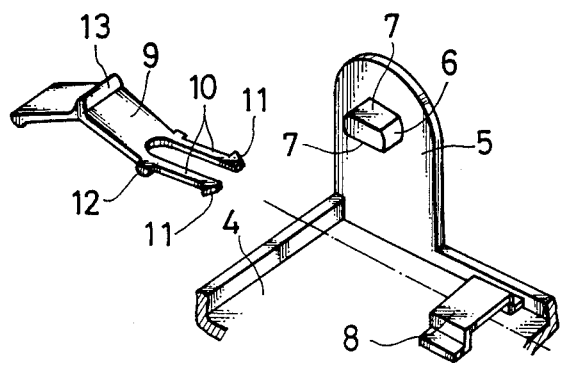
FIG. 6 is an exploded perspective view showing a fixing structure of a plate spring to the lid.

FIG. 6 is for partially showing one side of the base portion of the lid turned upside down, in which the tongue piece 5 is integrally provided with a fulcrum pin 6 projecting inwardly, and the fulcrum pin 6 is provided with flat portions 7 lying from side to side on its periphery. On the inner surface of the lid 4, there is further provided a crank-formed engagement member 8, fixed thereto by adhesion or the like located close to the fulcrum pin 6. Reference numeral 9 denotes one of a pair of plate springs made of a synthetic resin having resilience provided on both left and right sides, and the plate spring 9 is integrally provided with a pair of resilient legs 10 to be inserted into the engagement member 8, claws 11 formed on the end of the legs 10 for resiliently engaging with one end of the engagement member 8, stoppers 12 abutting on the other end of the engagement member 8, and a protrusion 13 serving as an engagement portion.

Figure 4:
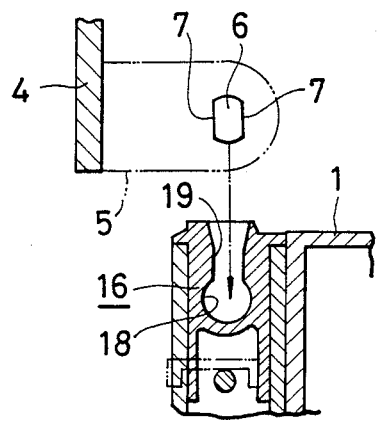
FIG. 4 is a vertically sectional side view showing the lid being attached to and detached from the housing.
Figure 5:
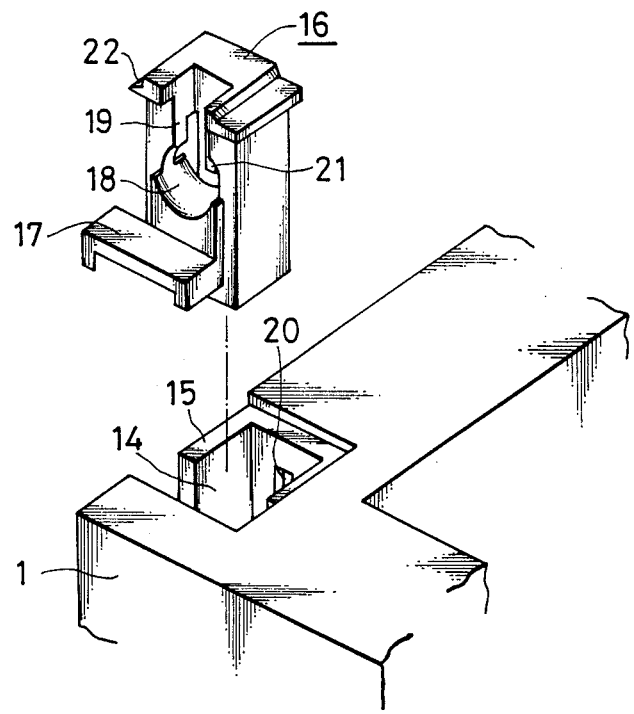
FIG. 5 is an exploded perspective view showing a fixing structure of a lid pivot to the housing.

FIG. 5 is a drawing partially showing one side of one end of the housing 1. The housing 1 is provided at both the sides with guide members 15 each thereof having a U-formed cross-section and an opening portion 14 for inserting the tongue piece 5 of the lid 4 therein. In this guide member 15, a lid pivot 16 made of a synthetic resin is fitted for vertical movement. The lid pivot 16 is provided, integrally formed therewith, a retaining portion 17 to confront a portion of the tongue piece 5 of the lid 4, a shaft hole 18 for rotatably fitting the fulcrum pin 6 therein, a cut 19 with a width corresponding to the width from one flat portion 7 to the other of the fulcrum pin 6, communicating with the shaft hole 18 and having an opening at its upper end, an elastic claw 21 adapted to project into a slit 20 cut in the guide member 15, and a recess 22 serving as an engagement portion to engage with the protrusion 13 on the plate spring 9 located at the upper portion. Further, as shown in FIG. 1 to FIG. 4, a spring 25 is stretched between a spring peg 23 formed integrally with the lid pivot 16 and a pin 24 fixed to the guide member 15.

Figure 1:
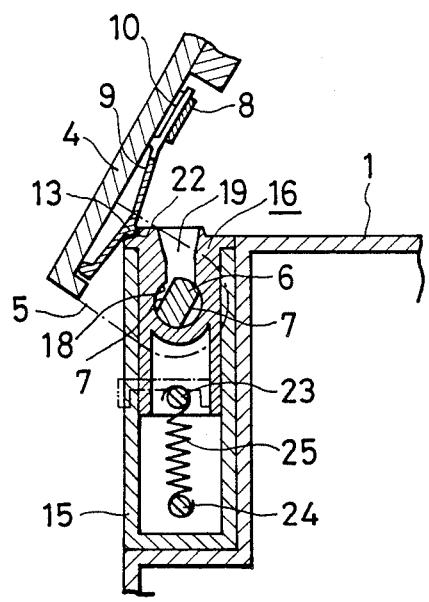
FIG. 1 is a vertically sectional side view showing an embodiment of the present invention in which the lid is stopped at where it is opened to a certain degree.

FIG. 1 shows the described arrangement in a state wherein the protrusion 13 on the plate spring 9 is resiliently engaged with the recess 22 in the lid pivot 16 and the deadweight of the lid 4 is supported by the elasticity of the plate spring 9. Since the lid 4 is thus stopped within its range of rotation, an original can be easily set onto the original table on the housing 1.

Figure 3:
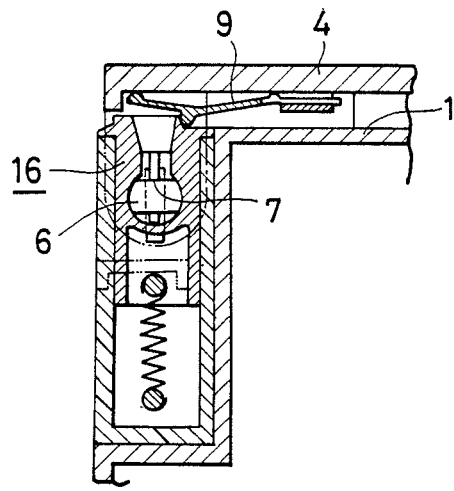
FIG. 3 is a vertically sectional side view showing the lid brought into close contact with the original table on the housing.

When the lid 4 is pressed toward the original table from the above described state, the plate spring 9 while being bent allows the protrusion 13 thereof to go beyond the recess 22 rotating around the fulcrum pin 6, so that the lid 4 puts the original into close contact with the original table as shown in FIG. 3. If the original is a thick one as a book, the lid 4 is caused by the resistance of the book to move upward, and thereby, the lid pivot 16 ascends against the pull of the spring 25. Thus, the lid 4 is always kept in parallel with the original table causing the original to be put in close contact with the original table.

Figure 2:
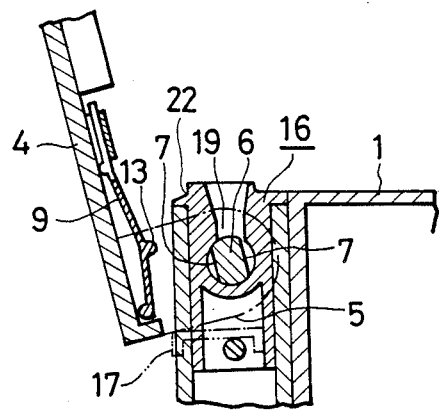
FIG. 2 is a vertically sectional side view showing the lid opened to the full.

When the lid 4 is further rotated upward as shown in FIG. 2, the tongue piece 5 comes in abutment with the retaining portion 17 whereby the angle of rotation of the lid 4 is limited.

Further, since the flat portions 7 formed on the fulcrum pin 6 are in parallel with the plane of the lid 4, the fulcrum pin 6 of the lid 4 in the state held upright as shown in FIG. 4 can be taken out from the shaft hole 18 through the cut 19, or put back in the shaft hole 18 therethrough. Thereby, when an image of a portion of an original having a larger area than the original table is to be read, the original can be spread out on the original table after removing the lid 4.

Further, since the lid pivot 16 is located just below the fulcrum pin 6 and supported by the housing 1 for vertical movement, it can be set up inserted in the housing 1 requiring only a small space.

The engagement portion to be put in engagement with the plate spring 9 for maintaining the lid 4 in a stopped state may be made in the top face of the housing 1 other than the lid pivot 16. The retaining portion 17 for limiting the range of rotation of the lid 4 may also be formed on the housing 1.

What is claimed is:

1. A lid opening and closing device for an image input apparatus comprising:
    a housing incorporating an optical reading unit therein and having a transparent original table provided on the top face thereof;
    a flat lid located over the top face of said original table;
    fulcrum pins arranged on a common axis and fixedly provided at least at both sides of the base of said lid;
    a lid pivot, with a shaft hole made therein for allowing said fulcrum pin to fit therein for rotation, adapted to fit in said housing at its one end for vertical movement while being urged downward;
    flat portions provided at portions of the periphery of said fulcrum pin virtually in parallel with the plane of said lid;
    therebeing a cut made in said lid pivot communicating with said shaft hole, with an opening at its upper end, and having a width smaller than the diameter of said shaft hole for guiding said flat portions of said fulcrum pin therethrough;
    a plate spring provided with an engagement portion attached to said lid on its inner face close to said fulcrum pin; and
    an engagement portion for engaging with the engagement portion on said plate spring when said lid is held opened at a desired angle with said original table.

2. A lid opening and closing device for an image input apparatus according to claim 1, wherein a recessed engagement portion for engaging with said engagement portion of said plate spring is made in the top face at one end of said lid pivot.

3. A lid opening and closing device for an image input apparatus according to claim 1, wherein said flat portions of said fulcrum pin are formed in parallel with the plane of said lid.

4. A lid opening and closing device for an image input apparatus according to claim 1, wherein said plate spring, which is made of plastic and provided with a projected portion at the center thereof for engaging with and disengaging from the engagement portion on the side of said housing, is adapted to be retained by a crank-formed engagement member provided on the inner face of the lid.

* * * * *